United States Patent
Bronicki et al.

[11] Patent Number: 6,101,959
[45] Date of Patent: *Aug. 15, 2000

[54] METHOD OF AND APPARATUS FOR EFFICIENTLY COMBUSTING OIL SHALE

[75] Inventors: Lucien Y. Bronicki, Yavne; Benjamin Doron, Jerusalem; Daniel Goldman, Raanana, all of Israel

[73] Assignee: Ormat Industries Ltd., Yavne, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/864,818

[22] Filed: May 29, 1997

Related U.S. Application Data

[63] Continuation of application No. 08/281,631, Jul. 28, 1994, abandoned.

[51] Int. Cl.[7] .................................................. F23D 1/00
[52] U.S. Cl. .................................... 110/347; 110/101 CF; 110/101 CA; 110/186; 110/101 C
[58] Field of Search .................. 110/101 CF, 101 CA, 110/101 C, 186, 190, 341, 346, 347

[56] References Cited

U.S. PATENT DOCUMENTS

| | | | |
|---|---|---|---|
| 4,313,387 | 2/1982 | Sato | 110/192 |
| 4,517,902 | 5/1985 | Christian | 110/190 |
| 4,893,315 | 1/1990 | Homer et al. | 110/186 X |
| 4,984,524 | 1/1991 | Mindermann et al. | 110/186 X |

FOREIGN PATENT DOCUMENTS

| | | |
|---|---|---|
| 0213980 | 3/1987 | European Pat. Off. . |
| 0496325 | 7/1992 | European Pat. Off. . |
| 1386394 | 12/1965 | France . |
| 3501990 | 7/1986 | Germany . |

OTHER PUBLICATIONS

"Spouted Beds" by Kishan B. Mathur and Norman Epstein, 1974, Academic Press.

*Primary Examiner*—Henry Bennett
*Assistant Examiner*—Malik N. Drake
*Attorney, Agent, or Firm*—Nath & Associates PLLC; Gary M. Nath; Jerald L. Meyer

[57] ABSTRACT

Oil shale having a relatively wide range of heating value is combusted by supplying the oil shale and a further fuel having a heating value greater than the heating value of the oil shale to a combustor. The oil shale is fed to the combustor at a substantially fixed rate, independently of the heating value of the oil shale, and the further fuel is fed to the combustor at a rate such that the heating value of the fuel in the combustor remains substantially constant in the face of variations in the heating value of the oil shale. Preferably, the temperature of combustion of the products of combustion is the parameter used to control the rate at which the further fuel is fed to the combustor.

42 Claims, 5 Drawing Sheets

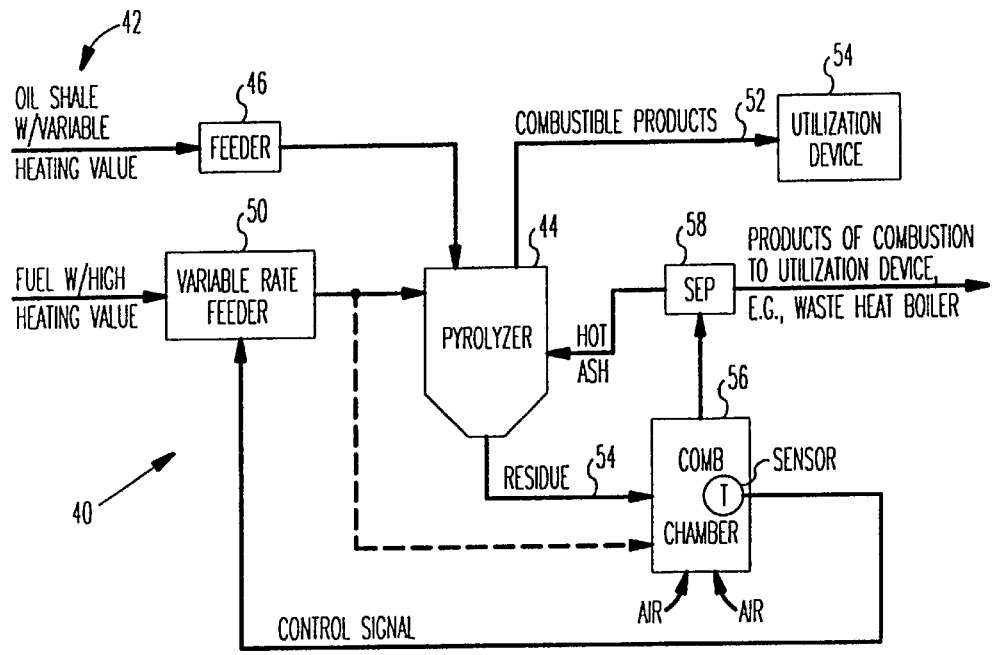
FIG. 2
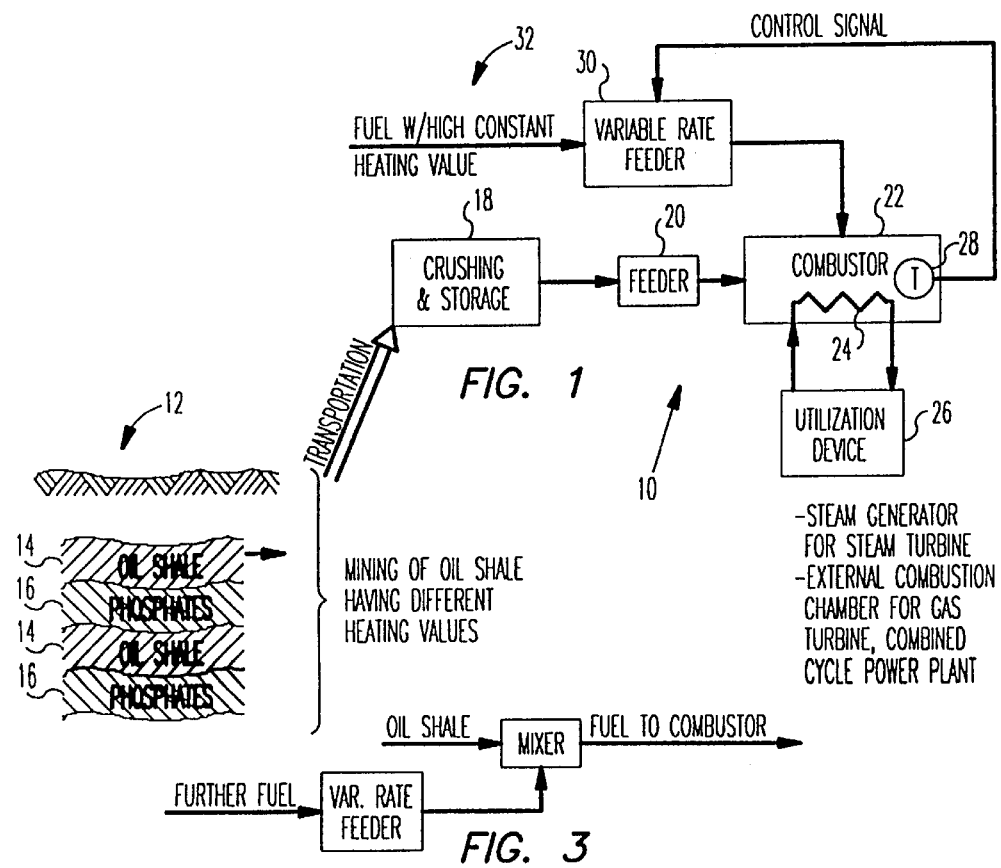
FIG. 1
FIG. 3

METHOD OF AND APPARATUS FOR EFFICIENTLY COMBUSTING OIL SHALE

This application is a continuation of application Ser. No. 08/281,631, filed Jul. 28, 1997, now abandoned.

FIELD OF THE INVENTION

This invention relates to a method of and apparatus for efficiently combusting low grade solid fuel, such as oil shale, particularly when its heating value varies.

BACKGROUND OF THE INVENTION

Oil shale deposits are found in many parts of the world, making the fuel available for generating power on a large scale. One of the problems in designing power plants operating on oil shale is caused by the large variations in heating value of shale mined from the same field. Specifically, in some fields, the heating value may vary in the range from less than about 600 Kcal/Kg to about 2000 or more Kcal/Kg depending on the strata from which the oil shale is extracted. Accommodating such variation complicates the design of the combustor for the oil shale.

A combustor designed for use with oil shale is usually constructed so that a set rate of feed of the oil shale in Kg/hr. into the combustor will produce rated heat in Kcal/hr. when the heat value of the oil shale has some average value. For example, a combustor to produce 1 million Kcal/hr. using oil shale having a heating value of 1000 Kcal/Kg would be designed to have a throughput of 1000 Kg/hr. of oil shale. If, during actual operation, the heating value of the oil shale would drop to 600 Kcal/Kg, the throughput would have to be increased to 1667 Kg/hr. to maintain the same combustor heat output. This is physically not possible for a combustor of fixed size.

To accommodate variations in heating value, oil shale power plants segregate stockpiles of oil shale according to heating value, and select shale from different stockpiles by appropriate selection to obtain a blend with a substantially constant heating value. This approach complicates the operation of such power plants by reason of the requirement for blending, and the large storage areas for the different types of oil shale.

It is therefore an object of the present invention to provide a new and improved method of and apparatus for efficiently combusting oil shale, or other low grade solid fuels, which reduces the complexity of power plants operating on such low grade fuels.

BRIEF DESCRIPTION OF THE INVENTION

According to the present invention, combustion of a plurality of fuels having different heating values is achieved by supplying the fuels to a system having a combustor wherein combustion takes place producing products of combustion, and controlling the rate at which the fuels are supplied such that the heating value of the fuel in the combustor remains substantially constant. Specifically, the rate at which the fuels are supplied to the combustor varies in accordance with a parameter associated with the system. Preferably, the parameter is the temperature of the products of combustion.

Where one of the fuels is oil shale whose heating value varies over a period of time during which combustion takes place, and the other of the fuels has a higher heating value, the rate at which said other fuel is supplied to the combustor is dependent on a parameter of the system such as the temperature of the products of combustion. In one form of the invention, oil shale and coal are the fuels. In another form of the invention, oil shale and oil or petcoke or the like are the fuels.

BRIEF DESCRIPTION OF THE DRAWINGS

Embodiments of the present invention are described by way of example with reference to the accompanying drawings wherein:

FIG. 1 shows apparatus, according to the present invention, in block diagram form for varying the feed rate of fuel having a relatively high heating value in accordance with the temperature of combustor;

FIG. 2 is a block diagram showing apparatus according to the invention in which a pyrolyzer system is used;

FIG. 3 is a block diagram showing how the oil shale and further fuel can be mixed outside a combustor or pyrolyzer instead of inside;

DETAILED DESCRIPTION

Figure 4:
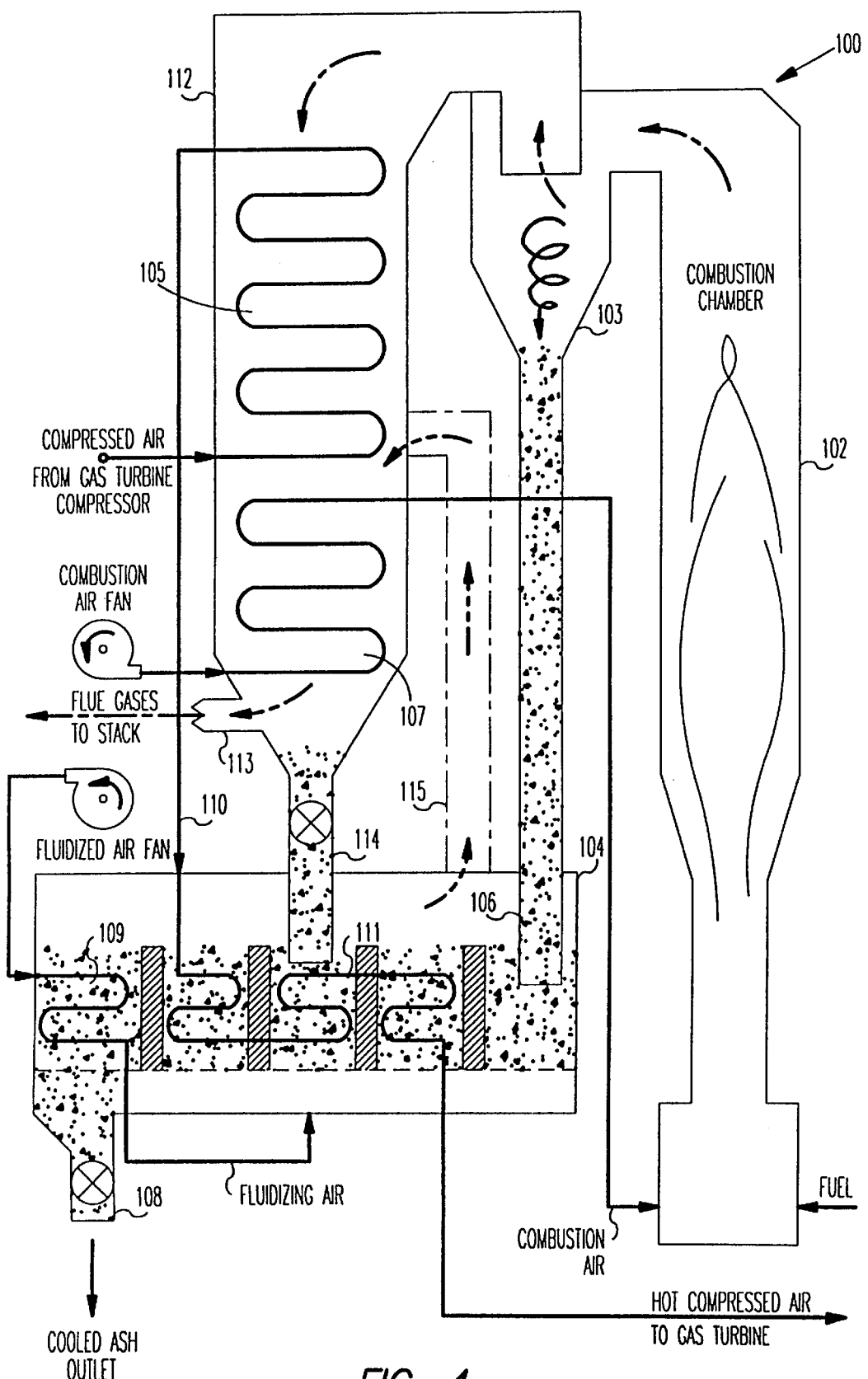
FIG. 4 is a schematic block diagram of a fluidized bed combustor that can be used with the present invention.

Turning now to the drawings, reference numeral 10 in FIG. 1 designates apparatus according to the present invention for combusting oil shale whose heating value varies or changes over the period of time during which combustion takes place. Reference numeral 12 designates a source of oil shale which typically includes multiple strata 14 of oil shale interleaved with other minerals such as rock, or as shown in the drawing, phosphate strata 16. Typically, oil shale from source 12 will have different heating values even when the material is extracted from the same strata, and particularly when the oil shale is extracted from different strata. Preferably, according to the invention, oil shale will be mined as shown from one strata at a time.

Instead of segregating the oils shale in piles having similar heating values, which is a common expedient in the conventional use of the shale for power generation purposes, the mines oil shale is transported to the use site without being segregated at the site. As indicated at 18, the oil shale is crushed and stored at the site and is available to feeder 20 which is designed to supply oil shale to combustor 22 at a predetermined rate. Combustor 22 may be a fluidized bed combustor, or spouted bed combustor as described in *Spouted Beds* by K. B. Mathur and N. Epstein, Academic Press, 1974, which is hereby incorporated by reference. Alternatively, combustor 22 may be another type of suitable combustor. Spouted bed combustors are presently considered advantageous for the combustion of oil shale because of the recirculation of ash and carbonaceous material which occurs in the combustor. Such recirculation ensures adequate heating of fresh oil shale supplied to the combustor so that substantially all of the organic material present in the oil shale is converted into vapor for combustion.

Combustion of the oil shale takes place in combustor 22 which can include heat exchanger 24 for heating a fluid, such as a working fluid, usually water, or air, which is supplied to utilization device 26. The utilization device may be a steam generator that supplies steam to a steam turbine that drives a generator, or an external combustion chamber for use with a gas turbine, or as part of a combined cycle power plant, etc. When an external combustion chamber is used, a combustion chamber containing a ceramic heat exchanger can be used.

Alternatively, utilization device 26 may even be a combustion chamber for use in a gas turbine, or in a combined cycle power plant, wherein the fuel is combusted in air supplied to the combustion chamber by the compressor of the gas turbine. In such a case, ceramic filters can be used.

If the utilization device includes a combustion system, the combustion should be staged to reduce the production of $NO_X$ gases.

To compensate for variations in the heating value of the oil shale that is combusted in a system that includes combustor 22, and thus maintain a substantially constant heat input to the utilization device, the present invention provides for monitoring a parameter associated with the system, such as a parameter associated with the combustion that occurs in combustor 22. For example, the temperature of the working fluid exiting heat exchanger 24 can be monitored, and a drop in temperature would be attributed to a reduction in the heating value of the oil shale. Preferably, however, the temperature of combustion is monitored by temperature probe 28 which produces a control signal that is used to control the rate at which variable feeder 30 feeds another fuel 32 into combustor 28. Fuel 32 has a heating value higher than the heating value of the oil shale. For example, fuel 32 may be coal having a heating value typically about 6000 Kcal/Kg, or bituminous coal having a heating value of about 4000 Kcal/Kg. Alternatively, fuel 32 may be crude oil, fuel oil, petcoke, or other suitable fuel.

Further examples of low grade solid fuels, in addition to oil shale, are low heating value coals, coal mining waste (CULM, and GOB), sludge, refuse-derived-fuel (RDF), municipal solid waste (MSW), agricultural waste, and cabul (peat), plastic waste, vehicle tires, etc. Further examples of high heating value fuels are lignite, coke, bituminous and anthracite coal, sulfur-rich oil and coal, etc. It is to be understood that these fuels are merely examples.

In operation, feeder 20 would operate to feed oil shale into combustor 22 at a substantially constant rate producing a combustion temperature consistent with rated heat being supplied to utilization device 26, for example, by way of heat exchanger 24. When the heating value of the oil shale drops, the temperature sensed by sensor 28 will tend to drop producing a control signal that activates feeder 30. Under some circumstances, feeder 30 will already be supplying fuel 32 to combustor 22; and in such case, the control signal will increase the rate at which feeder 30 feeds fuel 32 to combustor 22 thus increasing the combustion temperature and maintaining the rate of heat being transferred to the utilization device. When the heating value of the oil shale again increase, sensor 28 will sense an increase in combustion temperature and produce a control signal that will decrease the rate at which fuel 32 is supplied to the combustor. In this manner, the amount of heat being supplied to the utilization device will remain substantially constant despite variations in the heating value of the oil shale, or other low grade fuel. Consequently, the heating value of the composite fuel being burned in combustor 22 will remain substantially constant.

If preferred, in order to effect finer control on the heating value of the fuel combusted in combustor 22, the rate at which the oil shale is fed to combustor 22 can also be controlled according to a parameter of the system such as the temperature of the combustion gases sensed by sensor 28.

In an example, if a combustor were designed to produce a million Kcal/hr., using oil shale having a heating value of 1000 Kcal/Kg would require supplying 1000 Kg/hr. of the oil shale to the combustor. If the heating value of the oil shale were to drop to 600 Kcal/Kg, the amount of oil shale that would have to be supplied to the combustor would increase to 1667 Kg/hr. in order for the combustor to maintain its output using only the lower heating value oil shale. In accordance with the present invention, however, if the lower heating value oil shale were augmented with a higher heating value fuel, such as coal which may have a heating value of 6000 Kcal/Kg, only 926 Kg/hr. of oil shale, and 74 Kg/hr. of coal would have to be supplied to the combustor in order to maintain its million Kcal/hr. output.

Embodiment 40 shown in FIG. 2 represents apparatus according to the present invention for efficiently combusting oil shale utilizing a pyrolyzer. In this embodiment, oil shale 42 having a variable heating value is applied to pyrolyzer 44 by feeder 46 which operates such that oil shale is fed into the pyrolyzer at a substantially constant rate. In addition, another fuel 48 having a substantially constant heating value higher than the heating value of the oil shale is applied to the pyrolyzer by variable rate feeder 50. Mixing of the to fuels may take place in the pyrolyzer. However, the arrangement shown in FIG. 3 may be utilized whereby the two fuels are combined in mixer to form a composite fuel that is applied to the pyrolyzer.

The pyrolysis of the fuel in pyrolyzer 44 produces combustible products, such as gases, in conduit 52 which conveys the products to utilization device 54, e.g., a burner or the like which may be associated with a boiler for generating electricity. Alternatively, utilization device 54 may be an external combustion chamber for use in a combined cycle power plant. As a further alternative, utilization device 54 may be a combustion chamber for use in a gas turbine, or in a combined cycle power plant wherein fuel is combusted in air supplied to the combustion chamber by the compressor of the gas turbine. In such a case, ceramic filters can be used. When an external combustion chamber is used, the combustion chamber may contain a ceramic heat exchanger if preferred.

The carbonaceous residue of the pyrolyzer, which operates in the absence of oxygen, is extracted and fed via conduit or feeder 54 to combustion chamber 56 which may be, for example, a spouted bed combustor, a fluidized bed combustor, or other type of combustor. In the combustion chamber, the carbonaceous residue from the pyrolyzer is burned in the presence of excess air producing hot gaseous products of combustion in which coarse and fine ash particulate are entrained. The gaseous products of combustion and the entrained particulates are applied to separator 58, which may operate on the basis of producing a vortex flow pattern that separates the coarse particulate from the products of combustion. The separated hot particulate is fed back to the pyrolyzer to sustain its operation; and the gaseous products and fine particulate are fed to a further utilization device, for example, a waste heat boiler for utilization of the heat in the gaseous products of combustion, or external combustor for heating air for use in the gas turbine.

In accordance with the invention, the rate at which fuel 48 is fed to the pyrolyzer is controlled such that the heating value of the fuel in combustion chamber 56 remains substantially constant. This can be achieved by adjusting the rate at which fuel 48 is fed into the pyrolyzer in accordance with a parameter of the system, e.g., a parameter associated with the combustion process in combustion chamber 56. Preferably, the parameter is the temperature in the combustion chamber, namely the temperature of the products of combustion.

Alternatively, fuel 48 can be fed directly into combustion chamber 56 in accordance with a parameter of the system.

The operation of a pyrolyzer and combustor disclosed in this embodiment produces less $NO_x$ gases because this system is staged. In addition, the operating temperatures in the pyrolyzer and in the combustor, are less than about 1000° C. which also reduces production of $NO_x$ gases.

When the combustible products of the pyrolyzer are to be used as part of a combustion system for a gas turbine, the combustible products can be cleaned at high temperature using a ceramic filter before combustion takes place. Alternatively, the combustible products of the pyrolyzer can be filtered by passing them through a liquid bath, such as water. The combustible products may condense in the liquid, allowing filtration to take place before combustion occurs. Alternatively, the combustion products can be filtered in a hydrocarbon liquid which cools the products to 200–300° C. before the filtered products are combusted.

When a fluidized bed combustor, spouted bed combustor, or other combustor, is used in accordance with the present invention, it is preferred to extract heat from the ash and hot particulate exiting the combustor. An example of a presently preferred system for carrying out heat extraction is shown in FIG. 4 and is designated by reference numeral 100. Fuel is burned with heated combustion air in combustion chamber 102. Preferably, the walls of combustion chamber 102 are lined with ceramic material, rather than being water cooled. In an alternative mode of operation, the combustion chamber can be operated in a bubbling bed mode.

Relatively fine ash, and coarse ash or particulate, exiting combustion chamber 102 are separated from flue gases by separator 103. The coarse ash, or particulate, enter air heat exchanger 104 through outlet 106. Heat exchanger 104 is preferably a fluidized bed containing fluidizing air heater 109 and secondary air heater 111. In heat exchanger 104, heat is sequentially extracted from the coarse ash or particulate such that the coarse ash or particulate, which enters the heat exchanger at 106 at a relatively high temperature, moves towards outlet 108 of heat exchanger 104 as heat is transferred from the ash or particulate to the air in heat exchanger 111, and to the air in heat exchanger 109. A rotary valve controls the rate at which cooled ash exits the heat exchanger.

Fine ash and flue gases from separator 103 enter the top of heater 112, and travel downwardly encountering first primary air heater 105, and then combustion air preheater 107. At the bottom of heater 112, the flue gases are separated from the fine ash and pass into the base of stack 113; and the fine ash pass through exit 114 of heater 112 into heat exchanger 104, the rate of flow of ash being controlled by a rotary valve.

In primary air heater 105, compressed air from the compressor of a gas turbine unit is preheated before being supplied via conduit 110 to secondary air heater 111 wherein the compressed air is further heated before being delivered to the turbine of a gas turbine unit. In preheater 107, air for combustion of fuel in combustion chamber 102 is preheated before being supplied to the combustion chamber.

As can be seen from the drawing, the fine ash or particulate passes through air heater 112 and heat exchanger 104, while the coarse ash or particulate passes through only heat exchanger 104. In the present embodiment, there is no recirculation of the ash to the heat exchanger or air heater, and combustion chamber so that no extracted ash is returned to any of these components. Preventing recirculation of ash or particulate, achieves several advantages. First of all, less solids are handled enabling a smaller or more compact system to be used. Also, less breakup of the solid material takes place permitting easier operation of the system and less build-up of solid material in the system. Moreover, the present invention permits the fluidized bed heat exchanger to operate at substantially atmospheric pressures, thus reducing parasitic losses of the system. In addition, since all the particulates exit from the fluidized bed heat exchanger, the operation of the system is simplified or facilitated. For example, no additional cooler for cooling cooled ash exiting the system is required. Furthermore, since the walls of combustion chamber are not water cooled, more heat is available for heating the compressed air.

Finally, a reducing atmosphere is not present in the vicinity of the heat transfer tubes of the fluidized bed heat exchanger, since a carbon burn-up chamber can optionally be provided reducing the possibility of corrosion of conduit 111. Optionally, an optional feedback connection may be provided for feeding back gases in heat exchanger 104 to heater 112 as indicated by reference numeral 115.

Figure 5:
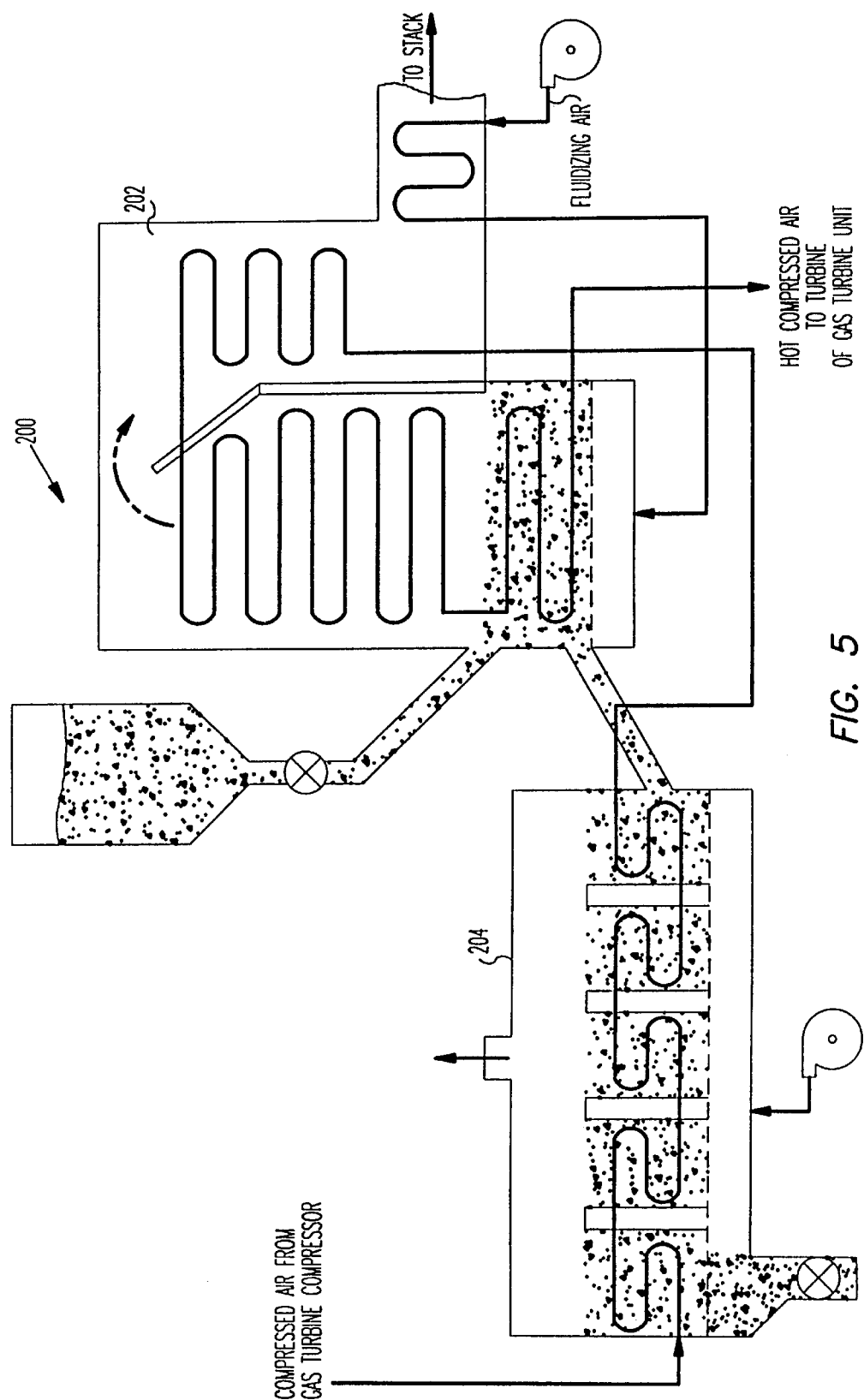
FIG. 5 is a schematic block diagram of a bubbling fluidized bed combustor utilizing a fluidized bed heat exchanger.

A further embodiment of the present invention is shown schematically in FIG. 5 and designated by reference numeral 200. This system includes bubbling fluidized bed combustor 202 as well as fluidized bed heat exchanger 204 of the same type as heat exchanger 104 described above in relation to FIG. 4. Thus many of the advantages of the system. mentioned with reference to the embodiment described in relation to FIG. 4, will also be present here. Here also, combustion chamber 204 can be lined with ceramic material, In the previously described embodiments, the walls of the combustor may be lined with ceramic. Alternatively, the walls of the combustors may comprise conduits having air flowing therethrough. In this manner, a portion of the heating of the air can be carried out in the conduits forming the walls of the combustion chamber.

Moreover, while the present embodiment is described with reference to heating compressed air for use in a gas turbine, the gas turbine being optionally contained in a combined cycle power plant, the present embodiment can be used for other heating purposes, e.g., heating air or other gases or water or other liquids. If water is heated in the conduits passing through air heater 112 or heat exchanger 104, steam can be produced for useful purposes such as operating a steam turbine.

When a fluidized bed combustor is used, the combustor can be staged in order to reduce the production of $NO_x$ gases.

Figure 6:
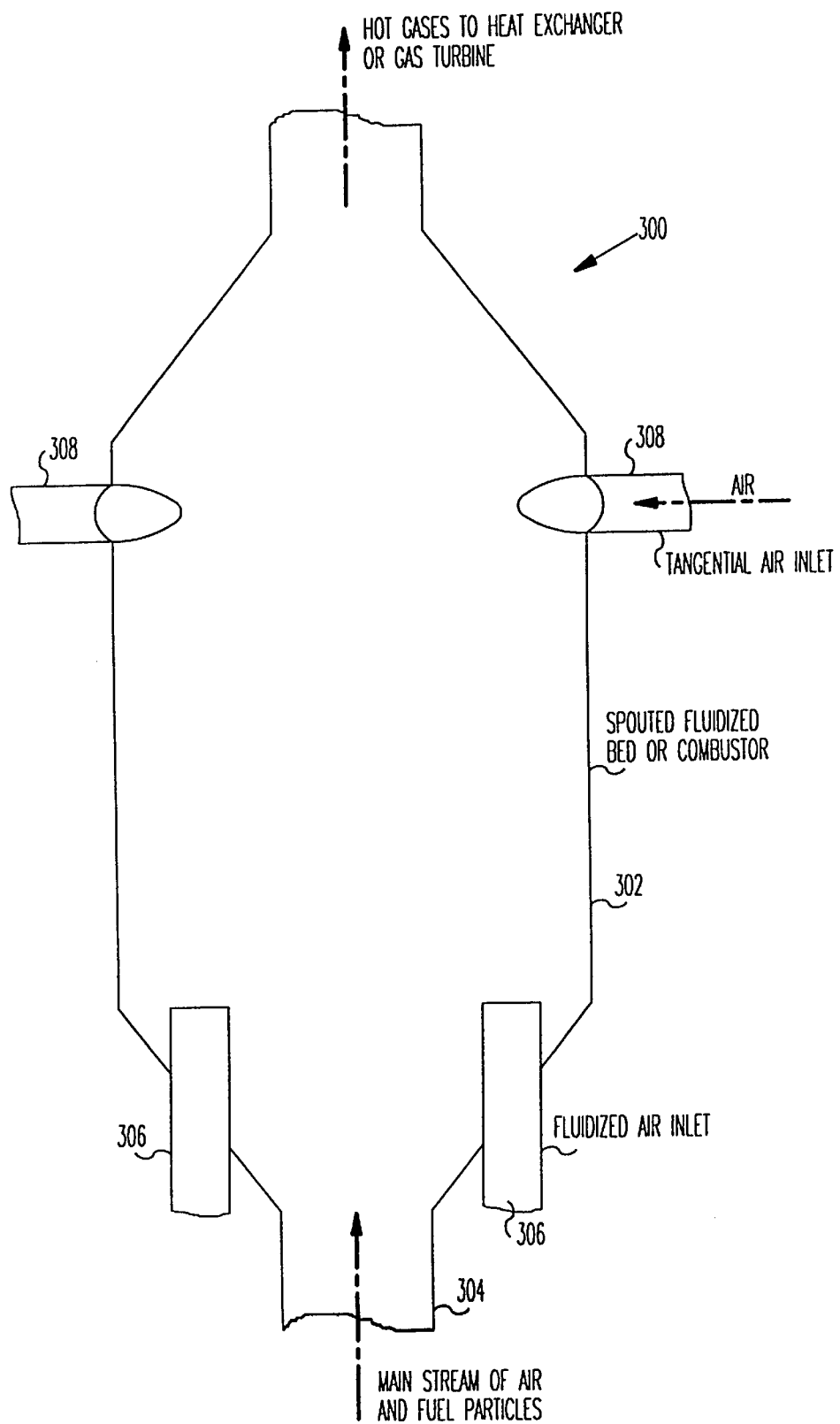
FIG. 6 is a schematic block diagram of a spouted bed combustor that can be used with the present invention.

Furthermore, when a spouted bed combustor is used in accordance with the present invention, a preferred embodiment of which is shown schematically in FIG. 6 and designated by reference numeral 300, additional air can be supplied to combustion chamber 302 to increase the quantity of air heated in the combustion chamber. Such heated air can be used for heating purposes such as heating compressed air in an indirect heat exchanger for use in a gas turbine. Alternatively, the air can be supplied directly to the turbine of a gas turbine. Also here, when an indirect heat exchanger is used, a ceramic heat exchanger advantageously can be used. In addition, when the hot air exiting combustion chamber is directly used, ceramic filters can be employed.

In the present embodiment, additional air is supplied to spouted fluidized bed combustor 302 through inlet orifice 304. This can be achieved by increasing the cross-sectional area of the inlet orifice. However, in order to maintain efficient operation of combustion chamber 302 as a spouted bed combustor, the cross-sectional area of the orifice cannot be increased without limit. The ratio of the mean particle diameter of the fuel to the diameter of the orifice may range from, e.g., 25 to 50 or even larger. Consequently, further air may be added to the combustion chamber via fluidizing air inlets 306 and tangential air inlets 308 present in the upper portion of combustion chamber 302. Tangential air inlets 308 serve to prolong the retention time of the particles in the combustion chamber. Such staged combustion should reduce the production of $NO_X$ gases due to fuel associated nitrogen. In addition, since such combustion is designed to operate preferably at temperatures below 1000° C., further production of $NO_X$ gases should also be reduced.

Figure 7:
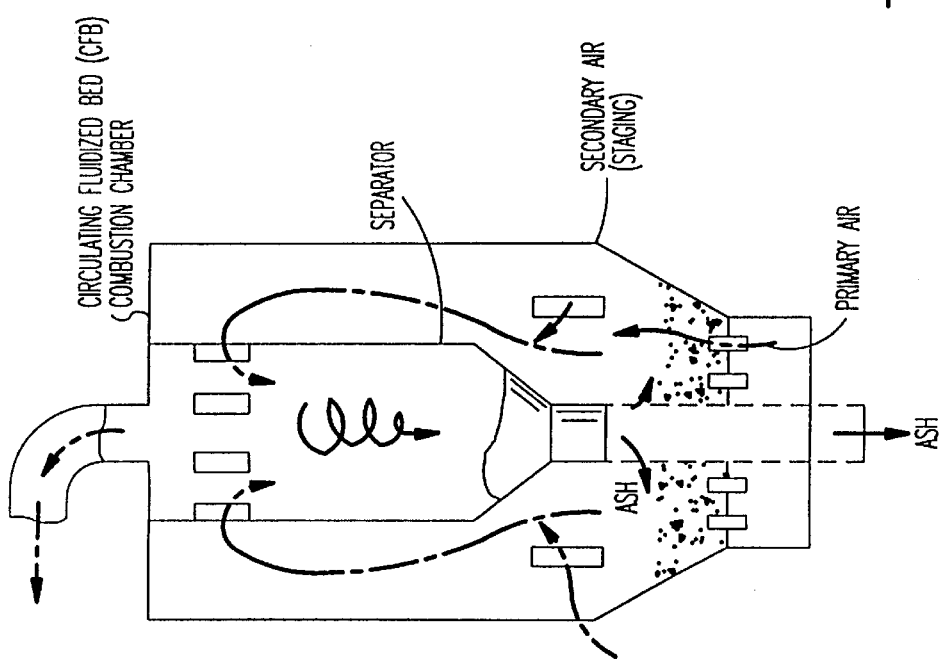
FIG. 7 is a schematic representation of a separation device located inside a circulating fluidized bed (CFB) combustion chamber.

In FIG. 7, a separator device is located inside a circulating fluidized bed (CFB) combustion chamber. As shown in this embodiment, the separated ash can be recirculated back to the combustion chamber, or alternatively, can be extracted from the system. To reduce $NO_X$ gas production in the combustion chamber, secondary staging air is added as indicated.

Figure 8:
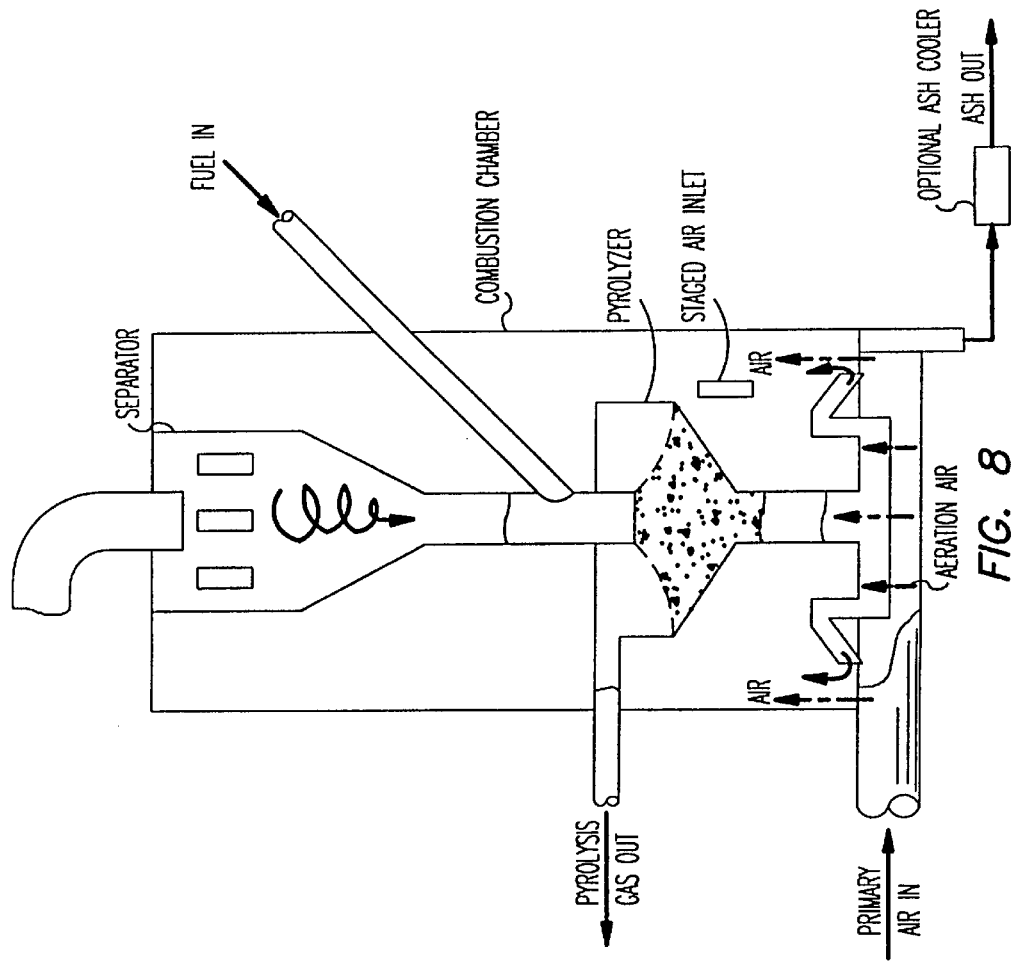
FIG. 8 is a schematic block diagram of a pyrolyzer located inside a circulating fluidized bed combustion chamber.

In FIG. 8, the pyrolyzer is located inside a circulating fluidized bed combustion chamber. Staged air may be introduced into the combustion chamber to reduce $NO_X$ gas production.

Furthermore, while the above-described embodiments have been described in conjunction with a system whose combustion chamber operates at a substantially constant heating value of the fuel being combusted, these embodiments, and in particular those described in relation to FIGS. 4 and 5, can also operate using only the low grade solid fuel, or even with sulfur rich fuel or material, or any other fuel having a relatively high heating value added to the low grade solid fuel even if the heating value of the fuel being combusted is not constant.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method for combusting, in system having a combustor, a plurality of individual fuels having different heating values comprising:
   a) supplying to the combustor wherein combustion takes place, a composite fuel comprising a mixture of said individual fuels having a composite heating value, for producing products of combustion;
   b) controlling the rate at which the individual fuels are supplied to the combustor such that the composite heating value of said mixture of fuels in the combustor remains substantially constant;
   c) wherein the rate at which said individual fuels are supplied to the combustor varies in accordance with the temperature of the products of combustion; and
   d) wherein one of said individual fuels is oil shale whose heating value varies over a period of time during which combustion takes place, and another of said individual fuels has a heating value higher than that of said oil shale, the rate at which said another fuel is supplied to the combustor being dependent on the temperature of the products of combustion.

2. A method according to claim 1 wherein said another of said individual fuels is coal.

3. A method according to claim 1 wherein said another of said individual fuels is oil.

4. A method according to claim 1 wherein said another of said individual fuels is petcoke.

5. A method according to claim 1 wherein said rate is such that the temperature remains substantially constant.

6. A method for combusting, in system having a combustor, a plurality of individual fuels having different heating values comprising:
   a) supplying to the combustor wherein combustion takes place, a composite fuel comprising a mixture of said individual fuels having a composite heating value, for producing products of combustion;
   b) controlling the rate at which the individual fuels are supplied to the combustor such that the composite heating value of said mixture of fuels in the combustor remains substantially constant;
   c) wherein said rate depends on the heating value of at least one of the fuels; and
   d) wherein said at least one of the fuels is oil shale.

7. A method according to claim 6 wherein said rate depends on the amount of organic material therein.

8. A method according to claim 6 wherein the rate at which another of said individual fuels is supplied to the combustor is such that said composite heating value of the fuels in the combustor remains substantially constant.

9. A method according to claim 8 wherein the rate at which said another of the fuels is supplied to the combustor varies in accordance with a parameter associated with the system.

10. A method according to claim 9 wherein said parameter is the temperature of the products of combustion.

11. A method according to claim 6 wherein the rate that the oil shale is supplied to the combustor is such that said composite heating value of the fuels in the combustor remains substantially constant.

12. A method according to claim 11 wherein the rate at which the oil shale is supplied to the combustor varies in accordance with a parameter associated with the combustion.

13. A method according to claim 12 wherein said parameter is the temperature of the products of combustion.

14. Apparatus for combusting in a combustor, a plurality of individual fuels having different heating values comprising:
   a) a feeder associated with each of said individual fuels for simultaneously supplying to the combustor wherein combustion takes place, a composite fuel comprising a mixture of said individual fuels having a composite heating value for producing products of combustion; and
   b) a feeder controller for controlling the operation of at least one of the feeders such that the composite heating value of said mixture of fuels in the combustor remains substantially constant;
   c) a sensor for sensing the temperature of the products of combustion and producing a control signal, the operation of said feeder controller being responsive to said control signal; and
   d) wherein one of said individual fuels is oil shale.

15. A method of combusting fuel in a combustor comprising the steps of:
   a) supplying said combustor with oil shale at a given rate;
   b) supplying said combustor with a further fuel so that a mixture of fuels is combusted in said combustor; and c) controlling the rate at which said further fuel is supplied to the combustor such that the heating value of said mixture is substantially constant over time.

16. A method according to claim 15 including mixing the oil shale with the further fuel creating a mixture that is then supplied to the combustor.

17. A method according to claim 15 wherein the rate at which oil shale is supplied to the combustor is substantially constant.

18. A method according to claim 15 including measuring the temperature at the exit of the combustor and controlling said rate so that said temperature remains substantially constant.

19. A method according to claim 15 including measuring a parameter associated with the oil shale, and controlling said rate in accordance with the measured parameter.

20. A method according to claim 19 wherein the parameter measured is the heating value of the oil shale.

21. A method according to claim 19 wherein the parameter measured is the amount of organic matter present in the oil shale.

22. A method according to claim 15 wherein said combustor is a fluidized bed combustor.

23. Apparatus for combusting fuel in a combustor comprising:
   a) means for supplying a mixture of different fuels to said combustor, at least one of which has a heating value that varies;
   b) means for controlling the relative rates at which the fuels are supplied to the combustor such that the heating value of said mixture remains substantially constant.

24. A method according to claim 15 wherein said combustor is a spouted bed combustor.

25. A method for using a first fuel whose heating value varies over time, and a second fuel whose heating value is higher than that of said first fuel and remains substantially constant over time, said method comprising:
   a) feeding said first fuel and said second fuel to a pyrolyzer wherein pyrolyzation takes place for producing combustible gases and a carbonaceous residue;
   b) feeding said residue into a combustion chamber wherein combustion takes place for producing products of combustion including ash and flue gases;
   c) separating ash from said products of combustion and feeding back some of the separated ash to said pyrolyzer for sustaining its operation; and
   d) controlling the rate at which the first and second fuels are supplied to the pyrolyzer such that the heating value of said residue remains substantially independent of variations in the heating value of said first fuel.

26. A method according to claim 25 wherein said first fuel is oil shale.

27. A method according to claim 25 including sensing the temperature in said combustion chamber, and controlling the rate at which said first fuel is fed to the pyrolyzer in accordance with said temperature.

28. Apparatus for using a first fuel whose heating value varies over time, and a second fuel whose heating value is higher than that of said first fuel and remains substantially constant over time, said apparatus comprising:
   a) a pyrolyzer for converting fuel contained in said pyrolyzer into combustible gases and a carbonaceous residue;
   b) a feeder for feeding said first fuel to said pyrolyzer;
   c) a feeder for feeding said second fuel to said pyrolyzer;
   d) a combustion chamber for receiving and combusting said carbonaceous residue and producing products of combustion containing ash;
   e) means for separating ash from said products of combustion and feeding the separated ash back to said pyrolyzer for sustaining its operation; and
   f) means for controlling the rate at which the first and second fuels are supplied to the pyrolyzer such that the heating value of said residue remains substantially independent of variations in the heating value of said first fuel.

29. Apparatus according to claim 28 wherein said first fuel is oil shale.

30. Apparatus according to claim 28 including means for sensing the temperature in said combustion chamber, and means for controlling the rate at which said first fuel is fed to the pyrolyzer in accordance with said temperature.

31. Apparatus according to claim 30 wherein said temperature is measured at the exit of the combustor.

32. A method for using a first fuel whose heating value varies over time, and a second fuel whose heating value is higher than that of said first fuel and remains substantially constant over time, said method comprising:
   a) feeding a first non-gaseous fuel and a second non-gaseous fuel having different heating values to a pyrolyzer, wherein pyrolysis of a mixture of both fuels takes place, producing combustible gases and a combustible carbonaceous residue, at least one of which is a combustible product;
   b) feeding said residue into a combustion chamber, wherein combustion takes place producing products of combustion including ash and flue gases; and
   c) controlling the rate at which said first and second fuels are supplied to said pyrolyzer such that the heating value of said combustible product remains substantially constant, thereby compensating for changes in the heating value of at least one of said fuels.

33. A method according to claim 32, wherein the rate at which said first and second fuels are supplied to said pyrolyzer is controlled such that the heating value of said residue remains substantially independent of variations in the heating value of said first fuel.

34. A method according to claim 32, including separating said ash from said products of combustion and feeding back some of the separated ash to said pyrolyzer for sustaining its operation.

35. A method according to claim 32, including sensing the temperature in said combustion chamber and controlling the rate at which said first fuel is fed to said pyrolyzer in accordance with said temperature.

36. A method according to claim 32, wherein said first fuel is oil shale.

37. Apparatus for using a first fuel whose heating value varies over time, and a second fuel whose heating value is higher than that of said first fuel and remains substantially constant over time, said apparatus comprising:
   a) a first feeder for feeding a first non-gaseous fuel to a pyrolyzer;
   b) a second feeder for feeding a second non-gaseous fuel to said pyrolyzer, wherein pyrolysis of a mixture of both fuels takes place, producing combustible gaseous and a combustible carbonaceous residue, at least one of which is a combustible product;
   c) means for feeding said carbonaceous residue to a combustion chamber, said combustion chamber receiving and combusting said carbonaceous residue and producing products of combustion containing ash; and d) means for controlling the rate at which said first and second fuels are supplied to said pyrolyzer such that the heating value of said combustible product remains substantially constant, thereby compensating for changes in the heating value of at least one of said fuels.

38. Apparatus according to claim 31, wherein said means for controlling the rate at which said first and second fuels are supplied to said pyrolyzer operates such that the heating value of said carbonaceous residue remains substantially independent of variations in the heating value of said first fuel.

39. Apparatus according to claim 31, including means for separating said ash from said products of combustion and feeding said separated ash back to said pyrolyzer for sustaining its operation.

40. Apparatus according to claim 31, including means for sensing the temperature in said combustion chamber and means for controlling the rate at which said first fuel is fed to said pyrolyzer in accordance with said temperature.

41. Apparatus according to claim 40, wherein said temperature is measured as the exit of said combustion chamber.

42. Apparatus according to claim 31 wherein said first fuel is oil shale.

* * * * *

UNITED STATES PATENT AND TRADEMARK OFFICE
CERTIFICATE OF CORRECTION

PATENT NO. : 6,101,959　　　　　　　　　　　　　　　　　　　　　　　Page 1 of 1
DATED : August 15, 2000
INVENTOR(S) : Bronicki et al.

It is certified that error appears in the above-identified patent and that said Letters Patent is hereby corrected as shown below:

Column 11, claim 38,
Line 6, delete the number "31" and insert the number -- 37 --.

Column 11, claim 39,
Line 11, delete the number "31" and insert the number -- 37 --.
and insert the number -- 37 --.

Column 12, claim 40,
Line 3, delete the number "31" and insert the number -- 37 --.

Column 12, claim 42,
Line 9, delete the number "31" and insert the number -- 37 --.

Signed and Sealed this

Thirteenth Day of November, 2001

*Attest:*

NICHOLAS P. GODICI
*Attesting Officer*　　*Acting Director of the United States Patent and Trademark Office*